United States Patent [19]

Blohm

[11] 4,367,255
[45] Jan. 4, 1983

[54] LINING SHEET

[75] Inventor: Donald H. Blohm, South Jordan, Utah

[73] Assignee: Baker International Corporation, Salt Lake City, Utah

[21] Appl. No.: 371,596

[22] Filed: Apr. 26, 1982

[51] Int. Cl.³ .............................................. B32B 3/06
[52] U.S. Cl. ................................ 428/99; 428/425.8; 52/309.2; 52/506
[58] Field of Search .................... 428/99, 425.9, 425.8, 428/105, 74; 52/309.16, 309.2, 506, 513, 707

[56] References Cited

U.S. PATENT DOCUMENTS

| | | | |
|---|---|---|---|
| 3,378,972 | 4/1968 | Stanley | 52/309.2 |
| 3,568,286 | 3/1971 | Ross | 428/105 |
| 4,020,610 | 5/1977 | Alexander | 52/513 |
| 4,037,009 | 7/1977 | Severinsen | 428/425.8 |

*Primary Examiner*—George F. Lesmes
*Assistant Examiner*—Beverly Johnson
*Attorney, Agent, or Firm*—Trask & Britt

[57] ABSTRACT

An improved lining sheet product for lining tanks, hoppers, chutes and the like includes a castable elastomeric sheet, an expanded-metal meshwork sheet cast within the elastomeric sheet, and bolt-type fastening members mounted at spaced-apart locations within the meshwork sheet. The fastening members, preferably flat countersunk elevator bolts, include head portions which fixedly seat within the meshes of the meshwork so that the strands of the meshwork act against the heads to prevent rotation and so that elastomer covers and protects the head from chemical attack or mechanical abrasion. Preferably, the fastening members include cap portions integral of the heads of area sufficient to span several of the strands of the meshwork to prevent the fastening members from being pulled through the sheet when tension is applied, as when nuts are tightened onto the shanks of the bolts.

10 Claims, 2 Drawing Figures

LINING SHEET

BACKGROUND OF THE INVENTION

1. Field

The present invention relates to a new and improved article of manufacture for lining tanks, hoppers, chutes, and the like. More particularly, the present invention relates to an improved and strengthened lining sheet cast of corrosion-resistant elastomeric material, such as urethane, for attachment to structural elements to line the interiors of tanks, hoppers, chutes and other apparatuses used to convey or contain abrasive and corrosive materials.

2. Prior Art

It is often desirable to provide sheets of elastomer or rubber to line devices such as pumps, conveyors, hoppers, chutes and tanks. This lining provides protection for the structural parts of the lined apparatus from abrasion and chemical attack. For example, where a granular flowable material moves against a surface of an apparatus, it is often necessary to provide a lining to protect the surface against abrasion as well as to provide a degree of cushioning against shock, vibration, scarring, fracture or other mechanical trauma. In addition, elastomeric or rubber linings may reduce the weight and cost of a lined machine, and may provide more readily cleanable surfaces.

The practical usage of elastomeric lining sheets, such as ones made of urethane, presents a number of difficulties. One shortcoming is that sheets of such material inherently are relatively structurally weak; that is, such sheets have little ability to resist bending or twisting, or to act as load-bearing members. To enhance the structural integrity of such sheets, it has been proposed to provide inserts made of metal or other rigid materials about which the elastomer may be molded. The usual technique for attachment is to bore a hole through the liner and then to affix the liner to a structural element by means of a rivet, bolt, screw, weldment or other connective means. These methods expose the connective means to corrosion and abrasion.

SUMMARY OF THE INVENTION

The present invention provides an improved and strengthened liner sheet cast of an elastomeric material to line the interiors of tanks, hoppers, chutes and other apparatuses used to convey or contain abrasive and corrosive materials. The liner sheet includes integral means to fasten the sheet to a structural member, the fastening means being protected from chemical attack and mechanical abrasion.

The sheet liner of the present invention includes a castable elastomeric sheet, a meshwork support sheet which is internally integral of the cast elastomeric sheet so as to be generally coextentive therewith, and fastening members mounted at spaced-apart locations within said meshwork support sheet. The meshwork sheet comprises a plurality of intersecting structural strands which together define a pattern of individual meshes. Each fastening member includes a head portion which fixedly seats within a mesh of the meshwork sheet and a shank which extends beyond an exterior surface of the elastomeric sheet. The enumerated components are arranged and located such that, when the elastomeric material is cast into a sheet, the meshwork sheet is medially located with respect to the opposing surfaces of the elastomeric sheet, and the heads of the fastening members are encapsulated, or covered, by the elastomeric material. The fastening members are thus protected from chemical attack or mechanical abrasion while, at the same time, being secured from rotation by the strands comprising the meshwork sheet. Preferably, the head portions of the fastening members each include integral cap portions which, when a head is located within one of the meshes, span several of the strands of the meshwork sheet. This arrangement senses to retain the head in position in the mesh as well as to prevent the fastening member from being pulled through the meshwork sheet when tension is applied.

BRIEF DESCRIPTION OF THE DRAWINGS

In the drawing, which illustrates what is presently regarded as the best mode for carrying out the invention.

DETAILED DESCRIPTION OF THE PREFERRED EMBODIMENT

Figure 1:
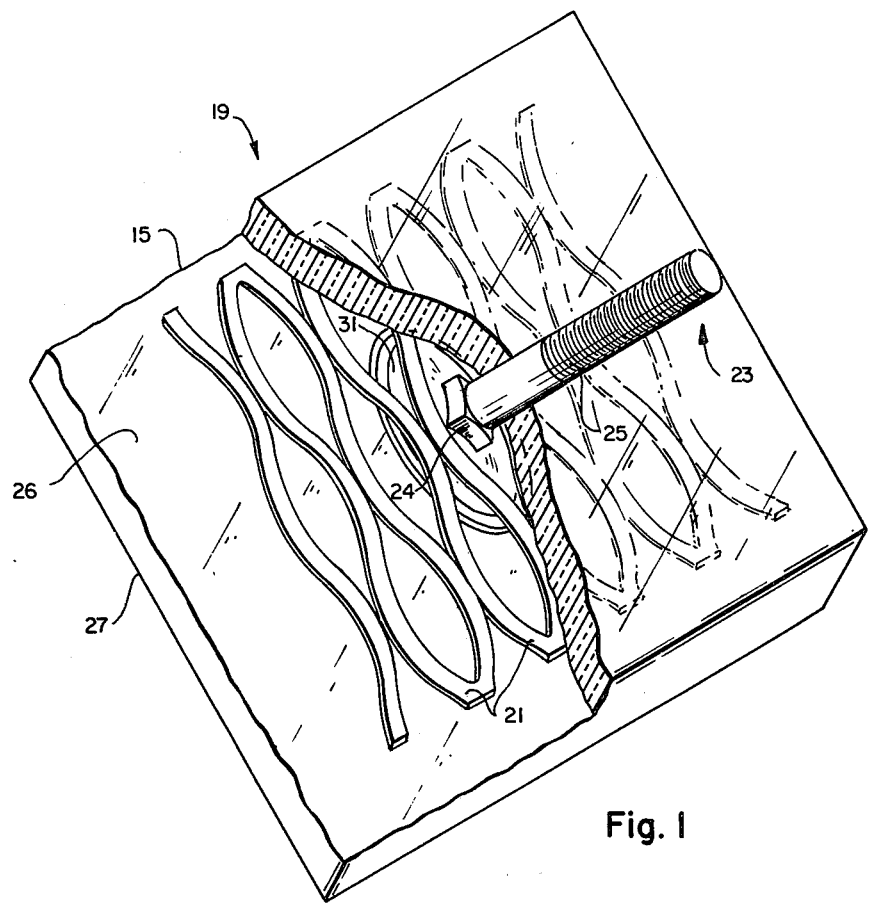
FIG. 1 is a pictorial view of a fragment of a product of manufacture according to the present invention partially in section.

As shown in FIG. 1, a product of manufacture according to the present invention comprises a castable elastomeric sheet 15, a meshwork sheet 19 which is comprised of interconnected strands 21 and which is internally integral of the elastomeric sheet 15, and a plurality of fastening members 23, (only one of which is shown for purposes of illustration), mounted at spaced-apart locations within the meshwork sheet 19 to extend perpendicularly thereto. The illustrated fastening member 23 includes an integral portion 24 which is fixedly seated within one of the meshes of the meshwork sheet 19 and a shank 25 which protrudes beyond an exterior surface 26 of the elastomeric sheet 15 to provide means to fasten the elastomeric sheet to some structural element (not shown) of a unit to be lined.

In practice the castable elastomeric sheet 15 is usually a material such as polyurethane, of either the polyether or polyester types. More generally, however, the sheet 15 may be formed of any castable elastomeric material or rubber which has the properties desired for a particular application as a lining material.

In the illustrated embodiment, the meshwork sheet 19 is located medially of the elastomeric sheet 15 and is generally coextensive therewith, between the opposing surfaces 26, 27. As a result, the meshwork sheet 19 serves as a reinforcing and strengthening means which improves the ability of the elastomeric sheet 15 to resist bending and twisting, as well as increasing its load-bearing capacity. Such improved characteristics are especially important where the elastomeric sheet is utilized to line a weight-bearing structure, including tanks and similar vessels whose interiors are subject to hydrostatic loading.

Preferably, the meshwork sheet 19 is a commercially-available product known as expanded metal sheeting. Expanded metal sheeting is typically fabricated from carbon steel or aluminum, although other materials of manufacture can be employed. (One characteristic of such expanded metal sheeting is that it is stronger and lighter than the original sheeting from which it is formed.) In the particular instance depicted in FIG. 1, the meshes of the expanded metal sheeting have a so-called flattened-diamond configuration in which the short-way dimension (minor diagonal) of the mesh (center-to-center of the bridges) is about ½ inch and the long way dimension (major diagonal) of the mesh is about 1¼ inches. Alternatively, the center-to-center length and width of the meshes may be equal. (One source of manufacture of such expanded metal is Metalex Corporation of Libertyville, Ill.)

Figure 2:
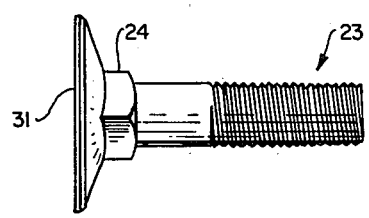
FIG. 2 is a side profile view of a bolt of the type which is particularly suitable for use with the product shown in FIG. 1.

Referring now to FIGS. 1 and 2, the illustrated embodiment of fastening member 23 essentially comprises a bolt of the type whose head 24 is countersunk and generally square in cross-section. In the sheet product of the present invention, the corner-to-corner diagonal of the countersunk head 24 should be equal to, or slightly less than the short-way dimension of the meshes in the meshwork 9. Accordingly, the countersunk head 24 seats within the mesh, with the corners of the head abutting the strands 21 which define the meshwork. (In other words, two of the opposed sides of the square head span the bridge formed by the opposed oblique-angle intersection of two strands.) In this assemblage, the strands 21 of the meshwork thus prevent the seated head 24 from rotating, especially when a nut is tightened onto the threaded shank 25. The expanded-metal meshwork 19 thus serves the dual function of strengthing the elastomeric sheet 15 and securing the fastening member 23 from rotation.

Preferably, the head of the fastening member 23 further includes an integral cap portion 31 of a diameter greater than the countersunk head 24 such that, when the head 24 of the fastening member is seated within one of the meshes of the meshwork, the cap 31 overlies or spans several strands 21 of the meshwork. In this way, when elastomer is cast over the meshwork, the cap 31 holds the fastening member 15 in seated positin in the meshwork and thus restrains the fastening member from back-and-forth wobbling. Further the cap 31 prevents the fastening member 23 from being pulled through the meshwork sheet 19 when tension is applied to the fastening member, as when a nut is tightened on the threaded section of the shank 25. Conversely, the head of the attachment member is protected by the elastomeric material, thus eliminating corrosive or abrasive attack upon an exposed bolt head.

In practice, a satisfactory fastening member 23 is a flat countersunk head elevator bolt. With a meshwork having ½ inch short-way dimension, a suitable elevator bolt would have a nominal diameter of ¼ inch and a cap of about 1.0 inch diameter. A standard bolt of this type has a head of 0.28 inch square-width (maximum). A ½ inch elevator bolt (½ inch nominal diameter with a cap of about 1½ inches in diameter) is suitable for use with a mesh having a short-way dimension of ¾ inch. A standard such bolt has a square width of 0.53 inch (maximum).

In special instances, it may be desirable to weld, solder or otherwise bond the fastening member directly to the meshwork. This is readily accomplished where the bolt and meshwork are formed of similar materials (e.g., both are made of steel).

Various processes can be employed to manufacture the above-described lining sheet. Typically, manufacture includes placing fastening member 23 at spaced-apart locations in the meshwork sheet 19 and then pouring liquid elastomer over the meshwork to form a sheet of the desired thickness and to encapsulate the heads of the fastening members. In the context of the present description, this process is referred to as molding.

Although the article of this invention has been illustrated and described as a planar element, it could have a curvilinear configuration. For example, if the elastomeric sheets are intended to form the lining of a circular tank, they could be formed as arcuate sectors. Other equivalents may be provided to the particular steps, materials and structures disclosed without departing from the scope of the invention. Accordingly, reference herein to details of the illustrated embodiment is not intended to restrict the scope of the appended claims, which themselves recite those features regarded as essential to the invention.

I claim:

1. An improved lining sheet for wear surfaces, comprising:
    an elastomeric sheet with opposed exterior surfaces;
    a meshwork sheet with individual meshes defined by intersecting strands, internally integral of said elastomeric sheet and located medially with respect to said exterior surfaces; and
    a plurality of fastening members, mounted at spaced-apart locations to said meshwork sheet, each member of said plurality having:
        a head portion which is fixedly seated within one of said meshes of said meshwork sheet, so that said head portion is encapsulated by the elastomeric material comprising said elastomeric sheet and the strands of said meshwork sheet act against said head to prevent rotation thereof, and
        a shank portion which protrudes generally perpendicularly beyond one of the exterior surfaces of said elastomeric sheet to provide means to fasten the elastomeric sheet in lining relationship with a wear surface.

2. An improved lining sheet according to claim 1 wherein said elastomeric sheet is made from polyurethane.

3. An improved lining sheet according to claim 2 wherein said polyurethane is cast to encapsulate said meshwork sheet.

4. An improved lining sheet according to claim 1 wherein said meshwork sheet is an expanded metal sheeting which is cast within said elastomeric sheet at a location medial the opposed exterior surfaces thereof.

5. An improved lining sheet according to claim 4 wherein the individual meshes in said meshwork sheet are diamond shape.

6. An improved lining sheet according to claim 5 wherein said diamond-shaped meshes are configured so that their short-way dimensions exceed their long-way dimensions.

7. An improved lining sheet according to claim 6 wherein said fastening members include head portions of square cross-section whose square width dimension is less than the short-way dimension of the diamond-shaped meshes.

8. An improved lining sheet according to claim 7 wherein said head portions are seated within said meshes such that two opposed sides of said square head span the opposed oblique-angle intersections of said strands defining said meshes.

9. An improved lining sheet product according to claim 5 wherein the head portions of said fastening members include an integral cap portion whose area is sufficient to span several of the strands which define the meshes in said meshwork sheet.

10. An improved lining sheet according to claim 1 wherein said elastomeric sheet is formed of a material which is substantially impervious to chemical degradation.

* * * * *